Figure 1:
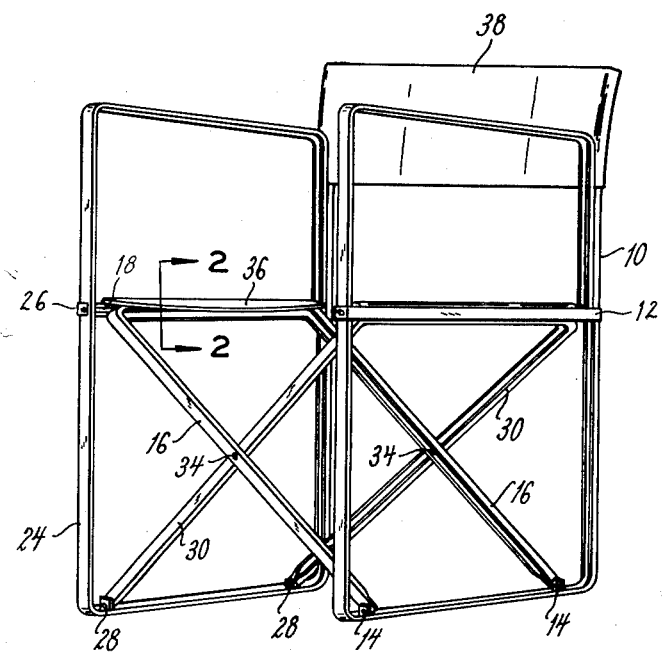

Feb. 24, 1953 W. O. HANSLICK 2,629,432
FASTENING DEVICE
Filed Sept. 28, 1950

INVENTOR.
WILLIAM O. HANSLICK
BY
*Rey Eilers*
ATTORNEY

Patented Feb. 24, 1953

2,629,432

UNITED STATES PATENT OFFICE 2,629,432

FASTENING DEVICE

William Otto Hanslick, Overland, Mo., assignor to Ashby Manufacturing Company, St. Louis, Mo., a corporation of Missouri Application September 28, 1950, Serial No. 187,220

10 Claims. (Cl. 155—187)

This invention relates to improvements in fastening devices. More particularly this invention relates to improvements in fastening devices that can be used to secure flexible materials to rigid elements.

It is therefore an object of the present invention to provide an improved fastening device that can be used to secure flexible material to a rigid element.

In the securing of flexible materials to rigid elements, as in the securing of the fabric seats of folding chairs to the frames of those chairs, it is customary to use tacks or stitches. Such tacks or stitches provide a number of spaced points of attachment between the flexible materials and the frames of those chairs. While those spaced points of attachment can secure the flexible materials to the frames of the chairs, they are not completely satisfactory because they concentrate heavy stresses at a number of individual points in the flexible materials. Such a concentration of stresses causes unduly rapid fatiguing of those portions of the flexible materials which must withstand those stresses. This is objectionable. The present invention obviates these objections by providing elongated fastening devices that are supported by the rigid elements of a structure and that clamp the flexible material to those rigid elements. Those fastening devices have elongated male elements and elongated female elements which coact to clamp the flexible material between them. The male and female elements of the fastening devices maintain a constant and even pressure along the entire length of the flexible material and thus prevent the creation of a small number of highly concentrated stresses in that flexible material. In this way, the present invention increases the life of the flexible material. It is therefore an object of the present invention to provide fastening devices which have elongated male and female elements that can clamp flexible material between them.

The elongated male and female elements of the fastening device provided by the present invention are of flexible material, and they can be assembled merely by pressing them together. This is very desirable because it obviates all need of special tools in the securement of the flexible material to rigid elements. In addition, the flexibility of such elongated male and female elements makes it possible for relatively unskilled persons to assemble those elements. It is therefore an object of the present invention to provide a fastening device with elongated, flexible male and female elements.

The resilience of the male and female members facilitates ready replacement and renewal of the flexible material. That replacement or renewal can be effected by merely snapping the flexible female element out of engagement with the flexible material, replacing or renewing the flexible material, and snapping the female element back into place over the flexible material. In this simple and quick way the flexible material can be replaced or renewed. This is highly desirable because it makes it possible to replace or renew the cloth seats of lawn chairs and other chairs exposed to the elements.

The female element of the fastening device provided by the present invention is so disposed relative to the flexible material that it responds to forces applied to that material to clamp that element into even tighter engagement with the male element. As a result, when weight and pressure are applied to the flexible material, that weight and pressure assure full resistance to their effect. This provides a double locking feature and makes the fastening device provided by the present invention doubly effective.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

Figure 3:
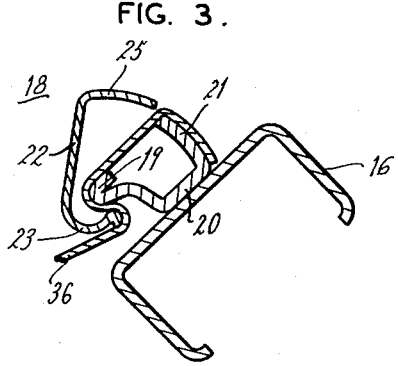
Figure 2:
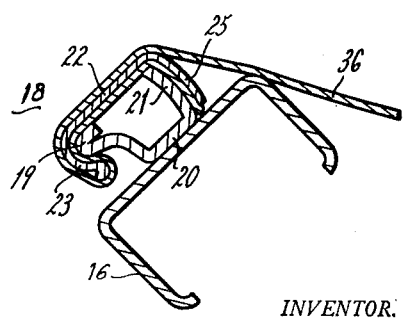

In the drawing Fig. 1 is a perspective view of a folding chair that includes the fastening device provided by the present invention, Fig. 2 is a cross-sectional, end view of the fastening device provided by the present invention, it is taken along the plane indicated by the line 2—2 of Fig. 1, and it shows that fastening device in fully clamped position, and Fig. 3 is a cross-sectional, end view of the fastening device provided by the present invention, and it shows that fastening device in partially clamped position.

Referring to the drawing in detail, the numeral 10 denotes a generally-oblong frame for the right hand side of a folding chair. That frame is made of a strip of metal of U-shaped cross section which is folded to have a rear stanchion, a bottom section, a front stanchion that is shorter than the rear stanchion, an arm-resting top section, and an overlying section that abuts and is coextensive with part of the rear stanchion. The overlying section of the strip of metal engages the rear stanchion of the frame 10 at a point below the upper end of that stanchion, and it extends downwardly in engagement with that stanchion to a point slightly above the midpoint of that stanchion. The overlying section of that strip of metal is preferably riveted to the rear stanchion. A stiffening and reenforcing transverse element 12 is riveted or otherwise secured to the front and rear stanchions of the frame 10 intermediate the upper and lower ends of those stanchions; and that element acts to stiffen and reenforce that frame. Pivot plates 14 are secured to the bottom section of the frame 10, and those pivot plates pivotally support a U-shaped frame 16. The arms of the U-shaped frame 16 are somewhat shorter than the front and rear stanchions of the frame 10; and thus the frame 16 will not project upwardly above the upper end of frame 10 when it is pivoted toward that frame.

The closed end of the U-shaped frame 16 carries the fastening device 18 provided by the present invention. That fastening device has an elongated male element 20 which is welded or otherwise secured to the closed end of the U-shaped frame 16. The elongated male element 20 receives an elongated female element 22; both elements 20 and 22 being made of flexible metal such as steel. The elongated male element 20 has a sharply curved, pivot portion 19 and a gently rounded, arcuate portion 21. The sharply curved pivot portion 19 is disposed adjacent the outer edge of the closed end of the U-shaped frame 16 while the gently rounded, arcuate portion 21 is disposed adjacent the inner edge of that closed end. The elongated female element 22 has a sharply curved, pivot portion 23 at one side thereof and it has a gently rounded, arcuate portion 25 at the other side thereof; the pivot section 23 of female element 22 being dimensioned to fit over and enclose the pivot section 19 of the male element 20, and the gently rounded, arcuate section 25 of female element 22 being dimensioned to fit over the gently rounded, arcuate section 21 of the male element 20. The female element 22 is made sufficiently larger than the male element 20 to permit that female element 22 to secure a flexible material between the male element and itself.

The numeral 24 denotes a generally-oblong frame for the left hand side of the folding chair shown in the drawing. That frame is made of a strip of metal of U-shaped cross section which is folded to have a rear stanchion, a bottom section, a front stanchion that is shorter than the rear stanchion, an arm-resting top section, and an overlying section that abuts and is coextensive with part of the rear stanchion. The overlying section of the strip of metal engages the rear stanchion of the frame 24 at a point below the upper end of that stanchion, and it extends downwardly in engagement with that stanchion to a point slightly above the midpoint of that stanchion. The overlying section of that strip is preferably riveted to the rear stanchion. The left hand frame 24 is virtually identical to the right hand frame 10 of the folding chair. The frame 24 has a stiffening and reenforcing transverse element 26 riveted or otherwise secured to the front and rear stanchion of the frame 24 intermediate the upper and lower ends of those stanchions; and that element acts to stiffen and reenforce that frame. Pivot plates 28 are secured to the bottom section of the frame 24; and those plates pivotally support a U-shaped frame 30. The U-shaped frame 30 is similar to, and is the same size as, the U-shaped frame 16 that is pivoted to the frame 10.

The closed end of the U-shaped frame 30 carries a fastening device 18 which is similar to the fastening device 18 carried by the closed end of the U-shaped frame 16. Both fastening devices 18 have male members 20 welded or otherwise secured in place, and have female members 22 releasably securable to the male members 20; and both of those devices have the sharply curved, pivot portions 19 and 23 of the male and female elements 20 and 22 adjacent the inner edges of the closed ends of the U-shaped frames 16 and 30, while having the gently rounded, arcuate portions 21 and 25 of male and female elements 20 and 22 adjacent the outer edges of the closed ends of those U-shaped frames.

The fastening devices 18 on the closed ends of the U-shaped frames 16 and 30 can be used to secure the flexible material 36 to those U-shaped frames. This flexible material will serve as the seat of the folding chair, and it will be tightly held all along its side edges by the fastening devices 18. As a result, any weight and pressure applied to the flexible material 36 will be resisted by forces applied uniformly and continuously to the edges of that material by the fastening devices 18. A strip 38 of fabric material is provided with two channels at the ends thereof; as by folding the free ends of that strip back and stitching those free ends to the body of that strip. These channels in the strip 38 are dimensioned to telescope over and be held by those portions of the rear stanchions which project upwardly from the arm-resting sections of the frames 10 and 24.

The male elements 20 of the fastening devices 18 are longer than the female elements 22, and they are also longer than the closed ends of the U-shaped frames 16 and 30. As a result, those male elements project outwardly beyond the sides of the U-shaped frames 16 and 30 and extend into the spaces defined by the U-shaped cross sections of the metal strips which form the frames 10 and 24. Consequently, the U-shaped metal strips of frames 10 and 24 confine and guide the male members for vertical movement. Since those male members are fixedly secured to the closed ends of the U-shaped frames 16 and 30, those closed ends of the U-shaped frames 16 and 30 will also be guided for vertical movement by the U-shaped metal strips of frames 10 and 24.

The arms of the U-shaped frames 16 and 30 are dimensioned so the closed ends of those frames 16 and 30 can overlie and rest upon the transverse reenforcing and stiffening elements 12 and 26 of those frames. As a result, the transverse reenforcing and stiffening elements 12 and 26 limit the distance which the frames 10 and 24 can move during opening of the chair.

To secure the flexible material 36 of the seat to the closed ends of U-shaped frames 16 and 30, it is only necessary to separate the male and female elements 20 and 22 of the fastening devices 18. Thereafter, the free ends of the flexible material 36, usually a heavy fabric such as duck, are laid over the male elements 20 of the fastening devices 18 with the free ends of that flexible material extending inwardly and overlying the gently rounded, arcuate inner ends 21 of those male elements. The sharply curved, pivot portions 23 of the female members 22 are then moved adjacent the portions of flexible material which overlie the sharply curved, pivot portions 21 of the male elements 20 until those pivot portions 23 of the female elements 22 press the flexible material 36 between the pivot portions 19 and 23. Once this has been done, the female elements 22 are rotated about their pivot portions 23 until the gently rounded, arcuate portions 25 of those female elements engage those portions of the flexible material 36 which overlie the gently rounded, arcuate portions 21 of the male elements 20 and clamp those portions of flexible material 36 between the gently rounded, arcuate portions 21 and 25. In moving to clamping position, the female elements 22 will cause the male elements and themselves to flex; but once in clamping position the male and female elements 20 and 22 will assume near-normal configurations. To separate from each other and thus free the flexible material 36, the male and female elements 20 and 22 would again have to flex; and since those elements have some resistance to flexing, they will resist accidental separation. However, properly applied, prying forces under the lower edges of the gently rounded, arcuate portions 25 of the female elements 18 will cause the male and female elements 20 and 22 to flex and thus effect separation of the elements 20 and 22 with consequent freeing of the flexible material 36.

When the outer edges of the flexible material 36 are tightly clamped between the male and female elements 20 and 22, the adjacent portions of the flexible material will be folded around and will overlie the curved pivot portions 23 of the female elements 20. While the pivot portions 23 are sharply curved, those portions are round enough to avoid the creation of the sharp bending stresses which would be found in the flexible material 36 if that material was bent around a squared object. In addition, the flexible material 36 will engage and receive a part of its support from the upper edges of the gently rounded, arcuate portions 25 of the female elements 22. Consequently, no undue stresses will be created in the flexible material 36. The fact that the flexible material engages the upper edges of the gently rounded, arcuate portions 25 of the female elements 22 means that any weight which is placed upon the flexible material 36 of the seat will act to exert downward forces on the female elements 22 of the fastening devices 18. Such forces hold the fastening devices 18 in even tighter clamping relation with the flexible material 36.

The fastening device provided by the present invention is illustrated as it would be used in securing a fabric to a folding chair. However, that fastening device is not limited to use with fabrics, and it is not limited to use with folding chairs; that fastening devce being usable with folding cots, tents and other articles. The present invention can be used to secure leather, paper, plastic materials, wire, screen, or other flexible materials to supports of many different kinds and shapes.

Whereas a preferred embodiment of the present invention has been shown and described in the drawing and accompanying description it should be apparent to those skilled in the art that various changes may be made in the form of the invention without affecting the scope thereof.

What I claim is:

1. A fastening device that can be used to secure a flexible material to a rigid element and that comprises an elongated male element of flexible material, and an elongated female element of flexible material, said male element having a sharply curved pivot portion at one edge thereof and having a gently curved arcuate portion at the opposite edge thereof, said female element having a sharply curved pivot section at one edge thereof and having a gently curved arcuate portion at the opposite edge thereof, said sharply curved pivot portion of said female element being formed and dimensioned to telescope over the sharply curved pivot portion of said male element and to confine one portion of said flexible material between the sharply curved pivot portions of said male and female elements, said gently curved arcuate portion of said female element being formed and dimensioned to telescope over the gently rounded arcuate portion of said male element and to confine another portion of said flexible material between the gently curved arcuate portions of said male and female elements, said female elements being so dimensioned relative to said male element that said elements must flex as they are assembled with or separated from said flexible material, said pivot portions of said male and female elements providing an initial clamping force on said flexible material that can hold said flexible material until said gently rounded arcuate portions of said elements clamp said other portion of said flexible material between them.

2. A fastening device that can be used to secure a flexible material to a rigid element and that comprises an elongated male element of flexible material, and an elongated female element of flexible material, said male element having a sharply curved pivot portion at one edge thereof and having a gently curved arcuate portion at the opposite edge thereof, said female element having a sharply curved pivot section at one edge thereof and having a gently curved arcuate portion at the opposite edge thereof, said sharply curved pivot portion of said female element being formed and dimensioned to telescope over the sharply curved pivot portion of said male element and to confine one portion of said flexible material between the sharply curved pivot portions of said male and female elements, said gently curved arcuate portion of said female element being formed and dimensioned to telescope over the gently rounded arcuate portion of said male element and to confine another portion of said flexible material between the gently curved arcuate portions of said male and female elements, said female elements being so dimensioned relative to said male element that said elements must flex as they are assembled with or separated from flexible material, said pivot portions of said male and female elements confining said female element for rotation relative to said male element as said gently curved arcuate portions are moved into telescoping relation.

3. A fastening device that can be used to secure a flexible material to a rigid element and that comprises an elongated male element of flexible material, and an elongated female element of flexible material, said male element having a sharply curved pivot portion at one edge thereof and having a gently curved arcuate portion at the opposite edge thereof, said female element having a sharply curved pivot section at one edge thereof and having a gently curved arcuate portion at the opposite edge thereof, said sharply curved pivot portion of said female element being formed and dimensioned to telescope over the sharply curved pivot portion of said male element and to confine one portion of said flexible material between the sharply curved pivot portions of said male and female elements, said gently curved arcuate portion of said female element being formed and dimensioned to telescope over the gently rounded arcuate portion of said male element and to confine another portion of said flexible material between the gently curved arcuate portions of said male and female elements, said female elements being so dimensioned relative to said male element that said elements must flex as they are assembled with or separated from flexible material.

4. In a fastening device that is adapted to secure the flexible seat of a folding chair to a frame element of said chair and that has a female element and a male element which are capable of being assembled together to clamp a portion of said flexible seat between them but which are separable to free said portion of said flexible seat, the improvement which comprises sharply curved portions at corresponding edges of said male and female elements to clamp a portion of said flexible seat between them, and pressure-applying portions at the opposite edges of said male and female elements, said pressure-applying portions being dimensioned to clamp another portion of said flexible material between them, said corresponding edges of said male and female elements being disposed adjacent the outer edge of said frame element of said chair and being adapted to direct said portion of said flexible seat downwardly and outwardly of said chair, whereby said flexible seat can be folded upwardly and inwardly over the sharply curved portion of said female element so that pressure applied to said flexible seat can urge said female element into tighter engagement with said male element and said portion of said flexible seat.

5. In a fastening device that is adapted to secure the flexible seat of a folding chair to a frame element of said chair and that has a female element and a male element which are capable of being assembled together to clamp a portion of said flexible seat between them but which are separable to free said portion of said flexible seat, the improvement which comprises sharply curved portions at corresponding edges of said male and female elements to clamp a portion of said flexible seat between them, and pressure-applying portions at the opposite edges of said male and female elements, said corresponding edges of said male and female elements being disposed adjacent the outer edge of said frame element of said chair.

6. In a fastening device for flexible material that has a female element and a male element which are capable of being assembled together to clamp said flexible material therebetween but which are separable to free said flexible material, the improvement which comprises gripping portions at corresponding edges of said male and female elements to clamp a portion of said flexible material between them, and pressure-applying portions at the opposite edges of said male and female elements, said pressure-applying portions being dimensioned to clamp another portion of said flexible material between them, said gripping portions and said pressure-applying portions of said male and female elements being spaced apart, said portions of said flexible material spanning the space between said gripping portions and said pressure-applying portions.

7. In a fastening device for flexible material that has a female element and a male element which are capable of being assembled together to clamp said flexible material therebetween but which are separable to free said flexible material, the improvement which comprises gripping portions at corresponding edges of said male and female elements to clamp a portion of said flexible material between them, and pressure-applying portions at the opposite edges of said male and female elements, said male and female elements being dimensioned so flexing of said elements occurs as said elements are telescoped into clamping position, said flexible material extending outwardly from said gripping portions and extending along the exterior of the gripping portion of said female element and extending generally toward the opposite edges of said male and female elements to respond to tension thereon to force said gripping portion of said female element into tighter engagement with the said portion of said flexible material.

8. In a fastening device for flexible material that has a female element and a male element which are capable of being assembled together to clamp said flexible material therebetween but which are separable to free said flexible material, the improvement which comprises gripping portions at corresponding edges of said male and female elements to clamp a portion of said flexible material between them, and pressure-applying portions at the opposite edges of said male and female elements, said pressure-applying portions being dimensioned to clamp another portion of said flexible material between them, said flexible material extending outwardly from said gripping portions and extending along the exterior of the gripping portion of said female element and extending generally toward the opposite edges of said male and female elements to respond to tension thereon to force said gripping portion of said female element into tighter engagement with the said portion of said flexible material.

9. In a fastening device for flexible material that has a female element and a male element which are capable of being assembled together to clamp said flexible material therebetween but which are separable to free said flexible material, the improvement which comprises gripping portions at corresponding edges of said male and female elements to clamp a portion of said flexible material between them, and pressure-applying portions at the opposite edges of said male and female elements, said pressure-applying portions being gently rounded and arcuate, said gripping portions of said male and female elements constituting pivoting surfaces for said elements as said pressure-applying surfaces are rotated in relation to each other.

10. In a fastening device that is adapted to secure the flexible seat of a folding chair to a frame element of said chair and that has a female element and a male element which are capable of being assembled to clamp a portion of said flexible seat between them but which are separable to free said portion of said flexible seat, the improvement which comprises sharply curved portions at corresponding edges of said male and female elements to clamp a portion of said flexible seat between them, and pressure-applying portions at the opposite edges of said male and female elements, said corresponding edges of said male and female elements being disposed adjacent the outer edge of said frame element of said chair and being adapted to direct said portion of said flexible seat downwardly and outwardly of said chair, whereby said flexible seat can be folded upwardly and inwardly over the sharply curved portion of said female element so that pressure applied to said flexible seat can urge said female element into tighter engagement with said male element and said portion of said flexible seat.

W. OTTO HANSLICK.

REFERENCES CITED

The following references are of record in the file of this patent:

UNITED STATES PATENTS

| Number | Name | Date |
|---|---|---|
| 1,347,881 | Vetter | July 27, 1920 |